United States Patent
Zou et al.

(10) Patent No.: US 8,699,184 B2
(45) Date of Patent: Apr. 15, 2014

(54) SELF-ALIGNED BEVELS FOR WRITE POLES

(75) Inventors: Jie Zou, Eden Prairie, MN (US); Kaizhong Gao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/595,066

(22) Filed: Aug. 27, 2012

(65) Prior Publication Data

US 2013/0038965 A1 Feb. 14, 2013

Related U.S. Application Data

(63) Continuation of application No. 12/777,959, filed on May 11, 2010, now Pat. No. 8,381,392.

(51) Int. Cl.
*G11B 5/127* (2006.01)

(52) U.S. Cl.
USPC .................................................. 360/125.11

(58) Field of Classification Search
USPC ............... 360/125.03, 125.09, 125.1, 125.11, 360/125.12, 125.14, 125.22, 125.24
See application file for complete search history.

(56) References Cited

U.S. PATENT DOCUMENTS

| | | | |
|---|---|---|---|
| 7,006,326 B2 * | 2/2006 | Okada et al. | 360/125.13 |
| 7,159,302 B2 | 1/2007 | Feldbaum et al. | |
| 7,251,878 B2 | 8/2007 | Le et al. | |
| 7,477,481 B2 | 1/2009 | Guthrie et al. | |
| 7,506,428 B2 | 3/2009 | Bedell et al. | |
| 7,532,433 B2 * | 5/2009 | Kawato et al. | 360/125.08 |
| 7,716,813 B2 | 5/2010 | Lee et al. | |
| 7,777,988 B2 * | 8/2010 | Guan et al. | 360/125.3 |
| 7,924,528 B2 * | 4/2011 | Sasaki et al. | 360/125.15 |
| 8,107,193 B2 * | 1/2012 | Nunokawa et al. | 360/125.08 |
| 8,169,740 B2 * | 5/2012 | Sasaki et al. | 360/125.1 |
| 8,233,233 B1 * | 7/2012 | Shen et al. | 360/125.03 |
| 8,233,234 B2 * | 7/2012 | Hsiao et al. | 360/125.09 |
| 8,243,386 B2 * | 8/2012 | Kameda et al. | 360/125.09 |
| 8,264,792 B2 * | 9/2012 | Bai et al. | 360/125.15 |
| 8,277,669 B1 * | 10/2012 | Chen et al. | 216/22 |
| 8,379,347 B2 * | 2/2013 | Guan et al. | 360/125.15 |
| 8,381,392 B2 * | 2/2013 | Zou et al. | 29/603.16 |
| 2002/0097540 A1 | 7/2002 | Hayashi et al. | |
| 2002/0170165 A1 | 11/2002 | Plumer et al. | |
| 2004/0095691 A1 | 5/2004 | Lin et al. | |
| 2005/0219743 A1 * | 10/2005 | Guan et al. | 360/125 |

(Continued)

OTHER PUBLICATIONS

Office Action dated Apr. 4, 2012 from U.S. Appl. No. 12/777,959, filed May 11, 2010.

*Primary Examiner* — Angel Castro
(74) *Attorney, Agent, or Firm* — Westman, Champlin & Koehler, P.A.

(57) ABSTRACT

A method, including depositing a layer of material onto a base portion of a wafer, is disclosed. The layer of material has a first surface adjacent the base portion. The method also includes depositing a pattern of masking material onto a portion of a second surface of the layer. Material from the layer of material that is unprotected by the pattern of masking material is removed from the layer of material. By removing such material a portion of the layer of material is suspended from the base portion.

13 Claims, 9 Drawing Sheets

(56) References Cited

U.S. PATENT DOCUMENTS

| | | |
|---|---|---|
| 2005/0264931 A1 | 12/2005 | McFadyen |
| 2007/0177301 A1 | 8/2007 | Han et al. |
| 2007/0217069 A1* | 9/2007 | Okada et al. .................. 360/126 |
| 2008/0239567 A1* | 10/2008 | Sasaki et al. .................. 360/111 |
| 2008/0316644 A1 | 12/2008 | Lee et al. |
| 2009/0168242 A1 | 7/2009 | Liu |
| 2009/0273863 A1 | 11/2009 | Kawano et al. |

* cited by examiner

US 8,699,184 B2

SELF-ALIGNED BEVELS FOR WRITE POLES

CROSS-REFERENCE TO RELATED APPLICATION

The present application is a continuation of and claims priority of U.S. patent application Ser. No. 12/777,959, filed May 11, 2010, now U.S. Pat. No. 8,381,392 the content of which is hereby incorporated by reference in its entirety.

BACKGROUND

Data storage systems such as disc drives typically include one or more storage discs that are rotated by a spindle motor. The surface of each of the one or more storage discs is divided into a series of data tracks. The data tracks are spaced radially from one another across a band having an inner diameter and an outer diameter. The data tracks extend generally circumferentially around the disc and can store data in the form of magnetic transitions within the radial extent of a given track. An interactive element, such as a magnetic transducer, is used to sense the magnetic transitions to read data from the given track. In addition, the interactive element can transmit an electric signal that causes a magnetic transition on the disc surface to write data to the given track.

The interactive element is mounted to an arm of an actuator. The interactive element is then selectively positioned by the actuator arm over a given data track of the disc to either read data from or write data to the given data track of the disc, as the disc rotates adjacent the transducer. The interactive element is positioned so that it hovers over the disc, supported by a volume of air between the interactive element and the disc.

As the areal density of a storage device increases, the width of each data track decreases, thereby allowing for more data tracks on the same overall area. Correspondingly, interactive elements that could formerly be positioned over a single data track when the data tracks were wider are now no longer capable of being positioned over a single data track without extending into area over neighboring tracks. In such cases, adjacent track interference may occur.

SUMMARY

In one illustrative embodiment, a method is discussed. The method includes depositing a layer of material onto a base portion of a wafer with a first surface of the layer adjacent to the base portion. The method further includes depositing a pattern of masking material onto a portion of a second surface of the layer and removing material from the layer of material unprotected by the pattern of masking material. A portion of the material removed is the first surface to cause a portion of the layer of material to be suspended from the base portion.

In another embodiment, a method is discussed. The method includes applying an electrically conductive layer of material onto a base portion of a wafer and removing a portion of the electrically conductive layer directly adjacent to the base portion so that a portion of the electrically conductive layer is suspended above the base portion.

These and other features and benefits that characterize embodiments of the present invention will be apparent upon reading the following detailed description and review of the associated drawings.

DETAILED DESCRIPTION OF ILLUSTRATIVE EMBODIMENTS

Embodiments of the present discussion provided below refer to elements fabricated from layers of thin film material applied to a substrate. One type of element discussed below that advantageously employs elements fabricated from layers of thin film material includes transducers of a read/write head that interact with a data storage device. One skilled in the art recognize that the embodiments may also be applied to other types of elements, including, for example, a sensor, a magnetic stack, integrated circuits, or other types of transducers and interactive elements.

Figure 1:
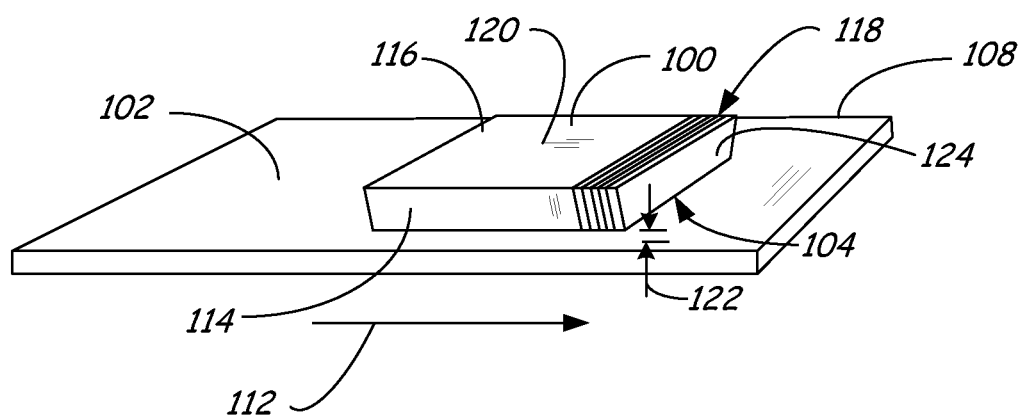
FIG. 1 is a schematic diagram providing a perspective illustration of an interactive element positioned relative to a disc drive according to one illustrative embodiment.

FIG. 1 provides a schematic representation of an interactive element 100 in close proximity to a portion of a surface 102 of a storage device 108. In some embodiments, the interactive element 100 is attached to an actuator arm (not shown in FIG. 1), which positions the interactive element 100 proximal to a selected data track on the storage device 108. The interactive element 100 is capable of reading/writing data from/to the data storage device 108.

The interactive element 100 illustratively includes a substrate 116, upon which a plurality of layers 118 are applied in a stack on the substrate 116 such as along the trailing edge of the substrate relative to the direction of the rotation of storage device 108, illustrated by arrow 112. In some embodiments, the plurality of layers 118 include write poles and/or read poles for writing information to and reading information from the storage device 108, respectively. The interactive element 100 is not drawn to scale, but shows the thickness of the layers 118 enlarged for illustrative purposes only. The actual thickness of the substrate and each of the layers of an interactive element can vary. In addition, the substrate in some embodiments is a substantially larger proportion of the overall thickness of the interactive element than is shown in FIG. 1. In addition, it should be appreciated that an interactive element can include more layers than are illustrated in FIG. 1.

The interactive element 100 has a first surface 120, which is generally positioned adjacent an actuator arm and a second surface 104, which opposes the first surface 120. The second surface 104 is positioned generally proximal to the surface 102 of storage device 108, separated only by a gap 122. The second surface 104 is known as an air bearing surface because the nature of the way the rotation of the storage device 108 creates an air pressure which acts against the actuator arm to maintain the gap 122 between the interactive element 100 and surface 102. Thus, the second surface is referred to as the air-bearing surface 104 through the remainder of the discussion. The interactive element has a trailing surface 124, which corresponds to a top of the plurality of layers 118 as they are applied onto the substrate 116.

Figure 2:
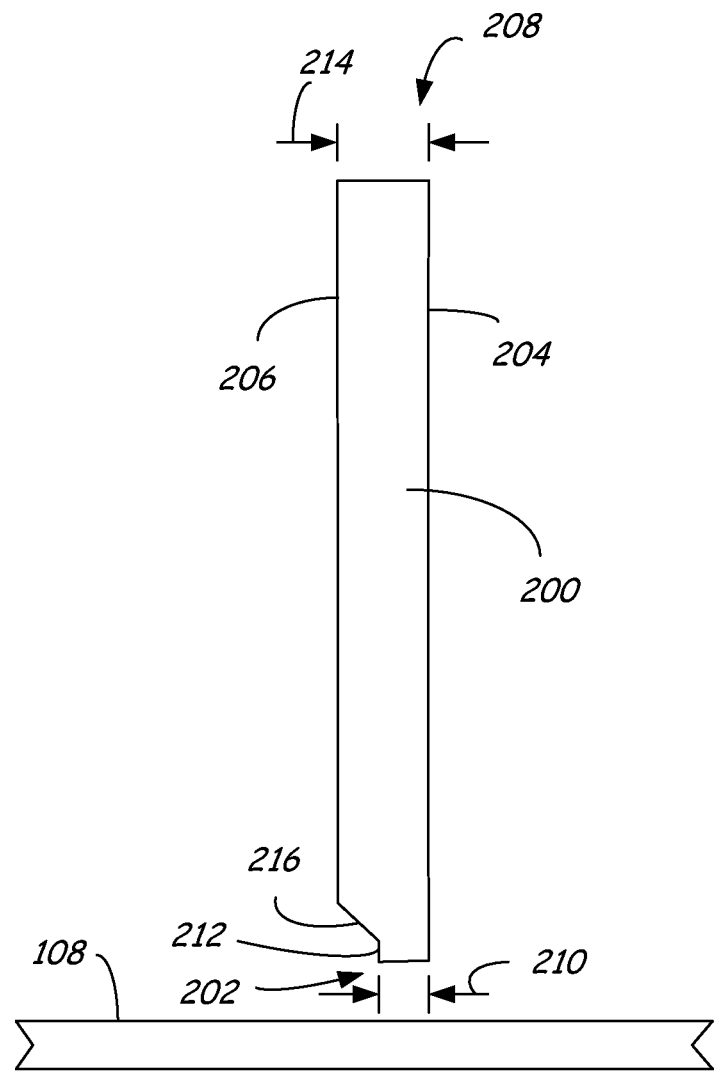
FIG. 2 illustrates a side view of a write pole of an interactive element of the type illustrated in FIG. 1 having a beveled side according to one illustrative embodiment.

FIG. 2 illustrates a side view of a write pole 200 according to one illustrative embodiment. The write pole 200 includes a proximal end 202, which faces a surface 102 of storage device 108 and may form part of the air-bearing surface 104 of the interactive element 100. For the purposes of this discussion, the write pole 200 has a top surface 204 and a bottom surface 206, which correspond to its orientation within a stack of layers. The use of the term height in this discussion describes the distance between the top surface 204 and the bottom surface 206 at any given point along the write pole 200. The write pole 200 also includes a distal end 208, which is opposite the proximal end 202. At the proximal end 202 of the write pole 200, the portion of the write pole 200 that is intended to be exposed along the air-bearing surface 104 has a height that is known as the top pole height 210. The write pole 200 has a height that is generally equal to the top pole height 210 as the write pole 200 extends away from the proximal end 202 or, put another way, extends behind the air-bearing surface 104 until a break point 212. At the break point 212, the height of the write pole 200 increases as the bottom surface 206 tapers away from the top surface 204 until the write pole 200 reaches an overall height 214. Thus, the bottom surface 206 of the write pole has a beveled portion 216 positioned behind, or away, from the air-bearing surface 104. It has been found that shaping a write pole 200 with a bevel such as bevel 216 located behind the air-bearing surface provides additional magnetic field by increasing the height of most of the write pole 200 as compared to a write pole without a bevel. In addition, by having a narrowed portion near the air-bearing surface 104, the magnetic field is focused sufficiently so as to avoid adjacent track interference. It has been found that it is advantageous for the bevel 216 to be positioned precisely so as to focus the magnetic field provided by the write pole in a desired location, that is, within a track over which the interactive element is positioned.

Figure 3:
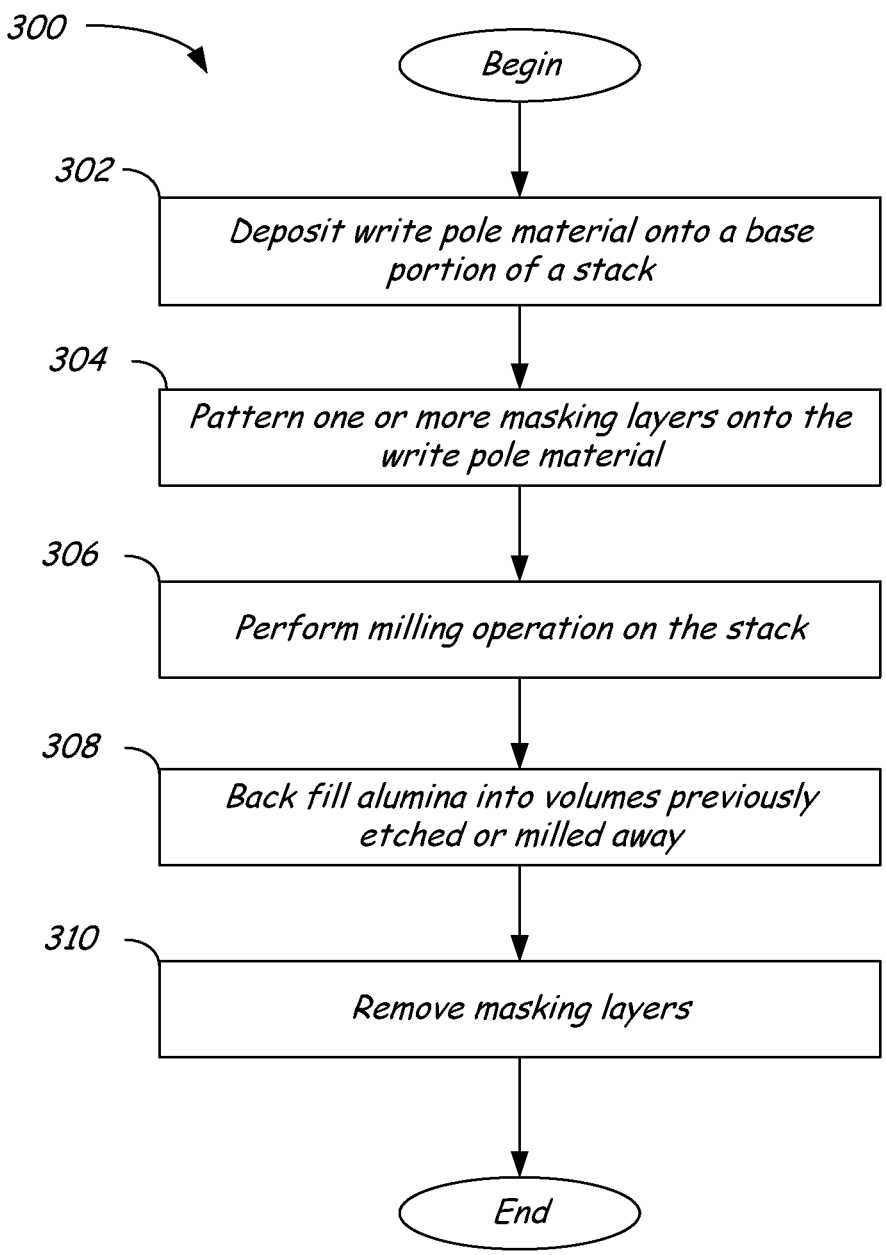
FIG. 3 illustrates a method of creating a portion of a wafer from which interface elements can be manufactured according to one illustrative embodiment.

The interactive elements discussed above are advantageously manufactured by applying layers of material onto a wafer and then milling the wafer to create individual interactive elements, according to one illustrative embodiment. FIG. 3 illustrates an illustrative method 300 for creating a portion of a wafer, from which interface elements such as interactive element 100 can be milled. More particularly, method 300 centers on the creation of a write pole portion of an interactive element having a bevel similar to the bevel 216 discussed above. It should be appreciated that once all of the layers of material have been applied to the wafer and any other processes performed on a wafer so that the wafer is completed, interactive elements are fabricated out of the wafer so that the air-bearing surface of the interactive element is a cross section of the various layers deposited onto the wafer, including the write pole.

Figure 4:
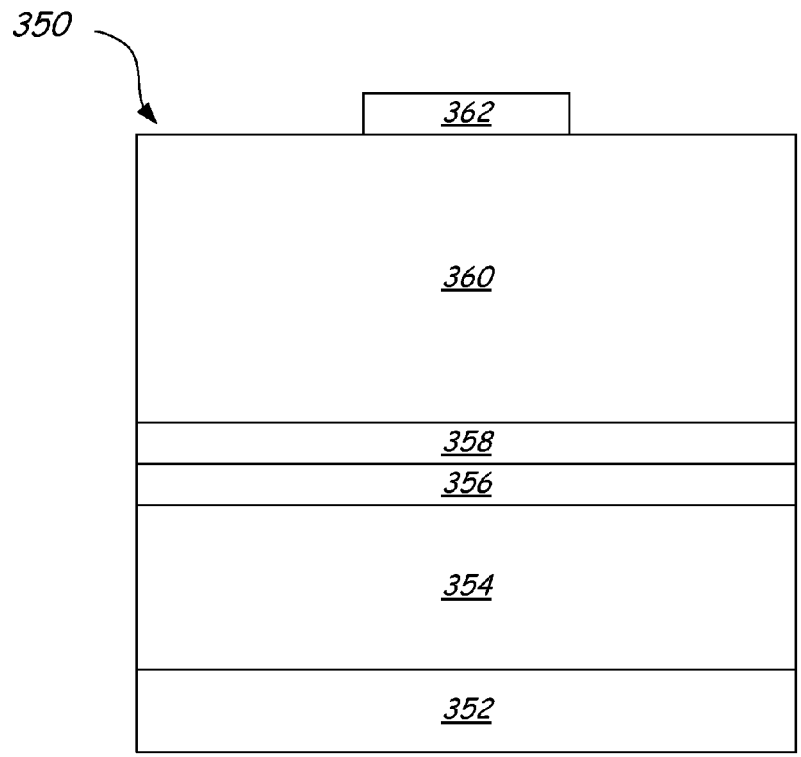
FIG. 4 is a side elevation schematic view several layers of material applied to a wafer for the purposes of manufacturing a write pole according to one illustrative embodiment.

At block 302, the method 300 includes depositing write pole material onto a substrate or base portion of a stack. The base portion can include various layers that have been previously applied to the substrate. FIGS. 4-14 illustrate various cross-sectional views of a portion of a wafer 350 at different stages of manufacture as described in the method 300. In FIG. 4, which is a cross sectional view of portions of several layers of material applied to the wafer 350, a substrate or base portion 352 is shown upon which a pole material 354 is deposited. The base portion 352 is illustratively a layer of alumina, although any suitable non-magnetic material may be used. It should be appreciated, of course, that in multi-layer stacks, the base portion 352 may include a number of layers previously applied to onto a substrate or it may be a first layer applied onto a substrate. The pole material 354 is deposited at a height of the top pole height plus the height of the bevel, which equals the overall height of the write pole.

Figure 4A:
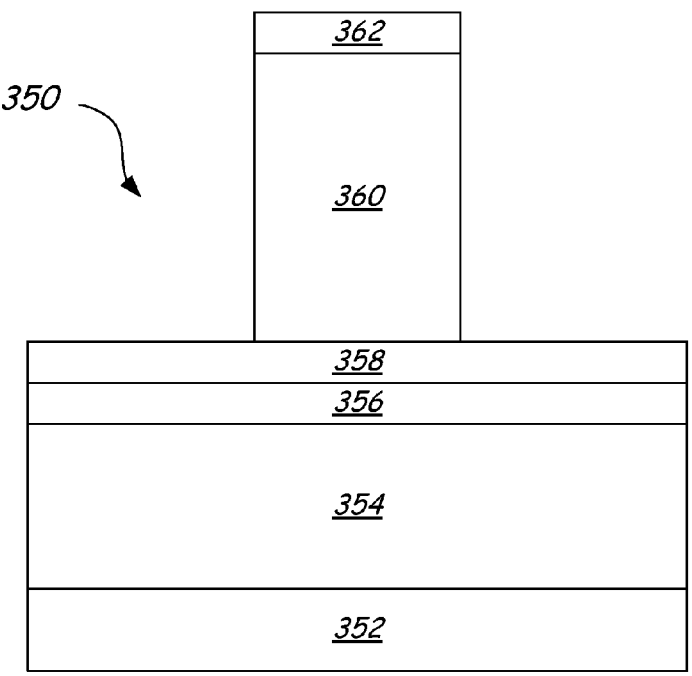
FIG. 4A is a side elevation schematic view of the several layers of material illustrated in FIG. 4 after a material removal process is performed to eliminate a portion of some of the layers.

After the pole material 354 is deposited onto the substrate 352, one or more masking layers are patterned onto the pole material 354. This is illustrated in block 304. Masking layers are applied to the pole material 354 to assist with controlling subsequent machining and/or etching processes, as described below. In one illustrative embodiment, layers 356, 358, 360 and 362 are applied to the pole material 354. Layer 356 is illustratively a layer of alumina applied directly onto the pole material 354. Layer 358 is illustratively a layer of chromium that is applied to the layer 356 using a photolithographic process. Layer 360 is formed from SiC and is applied to layer 358. Layer 362 is selectively selectively applied to layer 360 by employing a pattern masking process so that only a portion of the layer 360 is covered by layer 362. Once the layer 362 is patterned onto layer 360, an inductively coupled plasma etching process is illustratively employed to remove portions of layer 360. Since layers 358 and 362 are formed from chromium and since chromium is generally resistant to inductively coupled plasma etching after the etching process, layers 356, 358, 360, and 362 are generally shaped as illustrated in FIG. 4A after the etching process.

Figure 5:
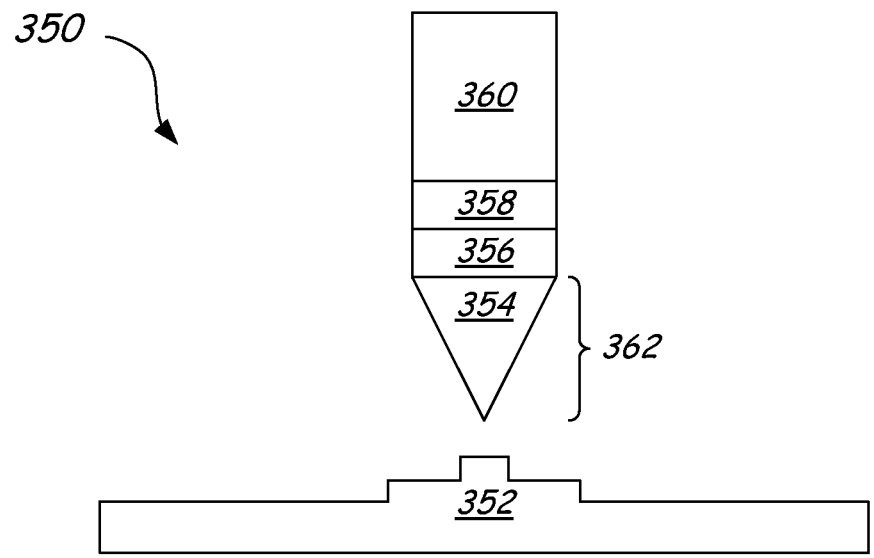
FIG. 5 is a cross sectional view of several layers of material applied to the wafer of FIG. 4 taken at what is an air-bearing surface of an interactive element at an intermediate stage during the manufacturing process of the interactive element.
Figure 6:
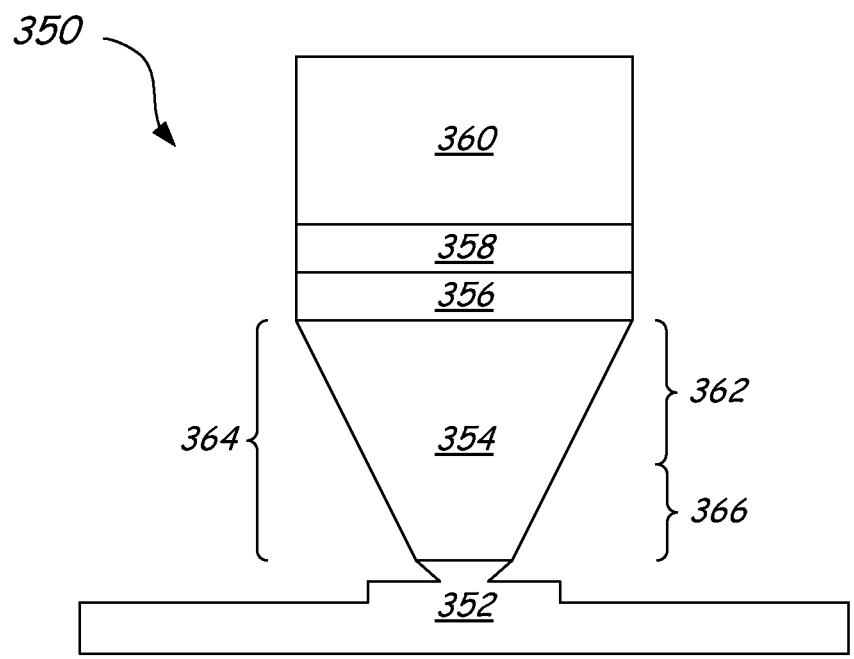
FIG. 6 is a cross sectional view of several layers of material applied to the wafer of FIG. 4 taken behind the air-bearing surface of the interactive element at an intermediate stage during the manufacturing process of the interactive element.

Method 300 also includes a milling process that is illustratively performed on the wafer 350. This is illustrated at block 306 and FIGS. 5 and 6. In one illustrative embodiment, the milling process is an ion milling process. During the milling process, material is removed from the wafer 350 until the layer of pole material 354 at the air-bearing surface is reduced to the top pole height 362 as is illustrated in FIG. 5 and is suspended from the base portion or substrate 352. It should be appreciated that FIG. 5 is an illustration of what eventually is the air-bearing surface of an interactive element such as interactive element 100. FIG. 5 does not illustrate any depth to the wafer 350—it merely illustrates the shape of the various layers shown at the air-bearing surface. FIG. 6 is another cross-sectional illustration of a portion of the wafer 350 taken at a surface that shows the maximum height 364 of the layer of pole material 354 after the milling process illustrated in block 306 has been performed. As discussed above, the maximum height 364 of the layer 354 of pole material equals the top pole height 352 plus the maximum bevel height 366.

Figure 7:
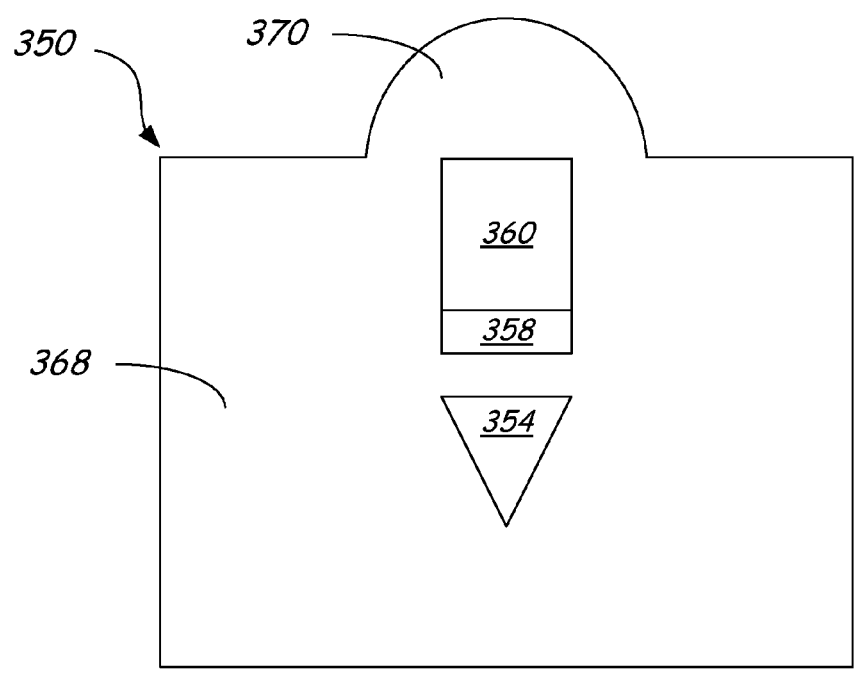
FIG. 7 is a cross sectional view of several layers illustrated in FIG. 5 after additional manufacturing procedures have been performed.
Figure 8:
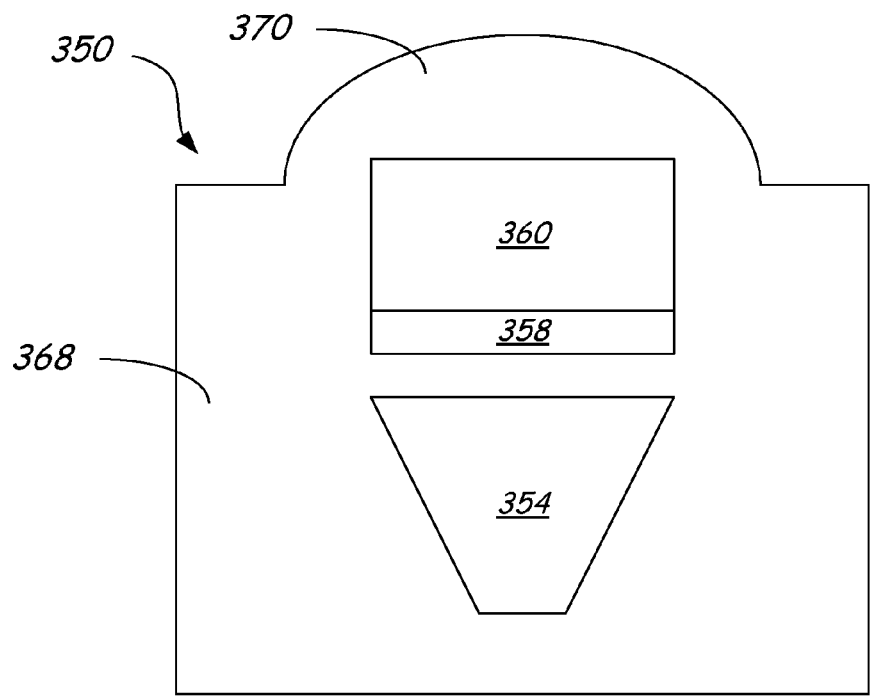
FIG. 8 is a cross sectional view of the several layers illustrated in FIG. 6 after additional manufacturing procedures have been performed.

After the milling process is completed, voids created by the previous etching and milling processes of the wafer 350 are illustratively filled with a non-magnetic material, which is applied to the wafer 350 as shown in block 308 and in FIGS. 7 and 8. In one illustrative embodiment, the same material that is used to form layers 352 and 356 is used to fill the voids. As discussed above, alumina is one material that may be used for such a purpose. FIG. 7, like FIG. 5, illustrates a cross sectional view of the wafer 350 taken at the air-bearing surface. Similarly, FIG. 8 is a cross sectional view of the wafer 350 taken in the same location as that of FIG. 6. As is illustrated in FIGS. 7 and 8, the pole material 354 is illustratively surrounded by non-magnetic material 368. In each of the figures, the newly applied non-magnetic material is shown to have joined with layers 352 and 356. Of course, it is to be appreciated that if the non-magnetic material 368 is not the same material as layers 352 and 356, these layers would be distinct from the non-magnetic material 368 that is applied as described in block 308. The non-magnetic material 368 is illustratively shown with a bulge 370 over that portion of the wafer where the layers 354, 358, and 360 are located.

Figure 9:
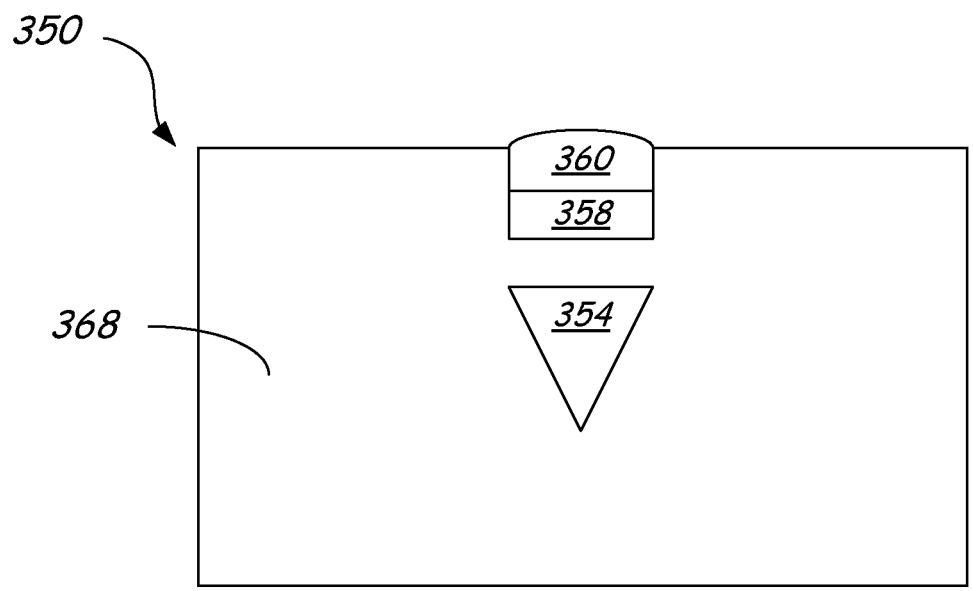
FIG. 9 is a cross sectional view of several layers illustrated in FIG. 7 after additional manufacturing procedures have been performed.
Figure 10:
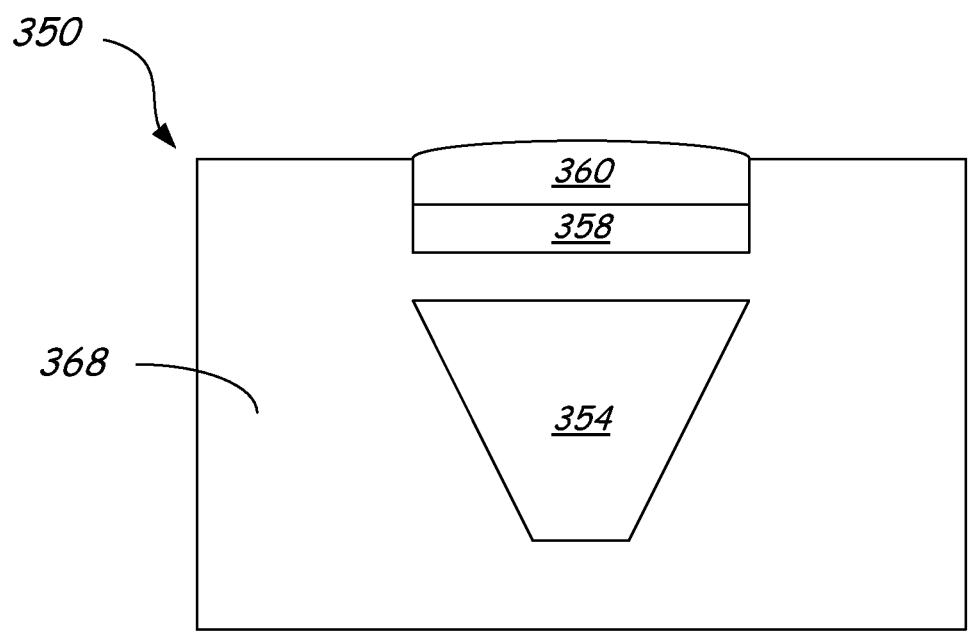
FIG. 10 is a cross sectional view of the several layers illustrated in FIG. 8 after additional manufacturing procedures have been performed.
Figure 11:
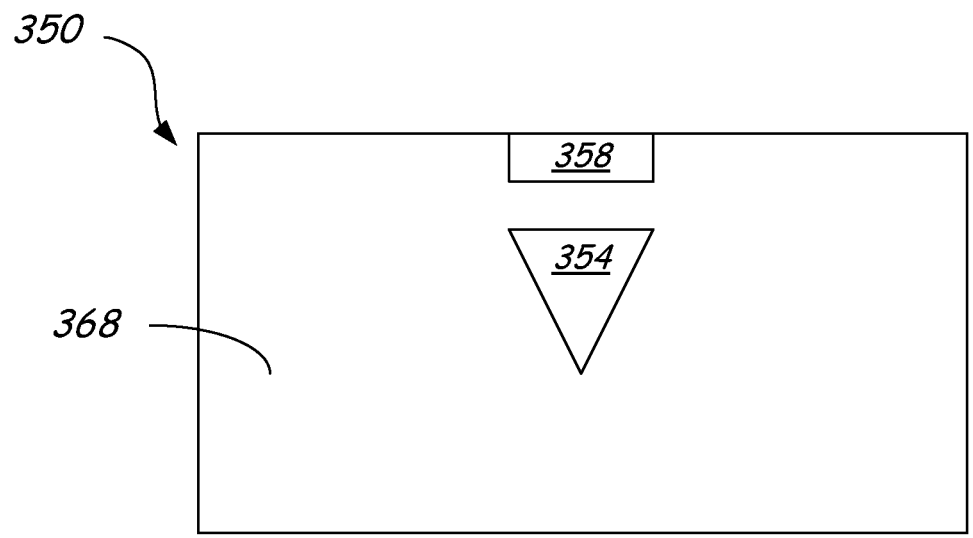
FIG. 11 is a cross sectional view of several layers illustrated in FIG. 9 after additional manufacturing procedures have been performed.
Figure 12:
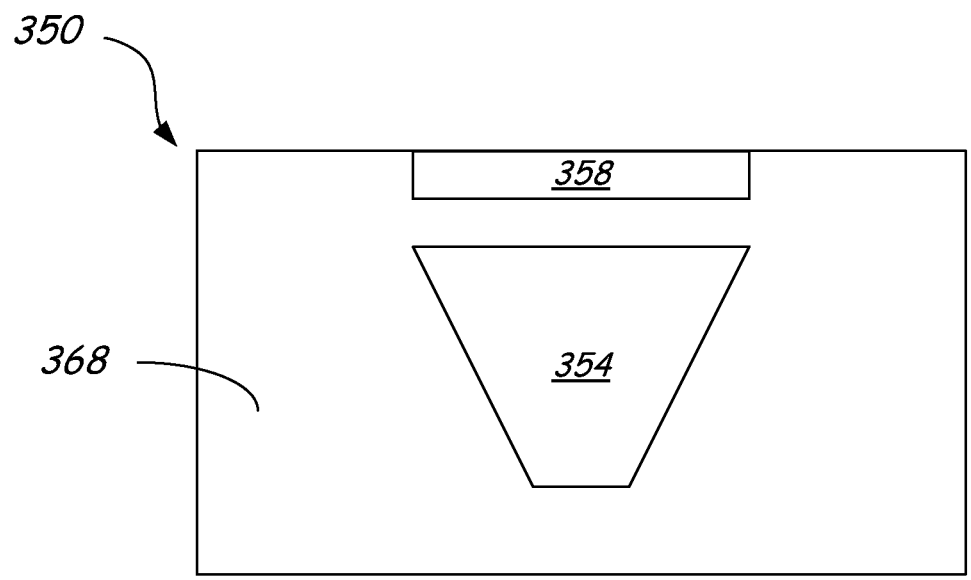
FIG. 12 is a cross sectional view of the several layers illustrated in FIG. 10 after additional manufacturing procedures have been performed.
Figure 13:
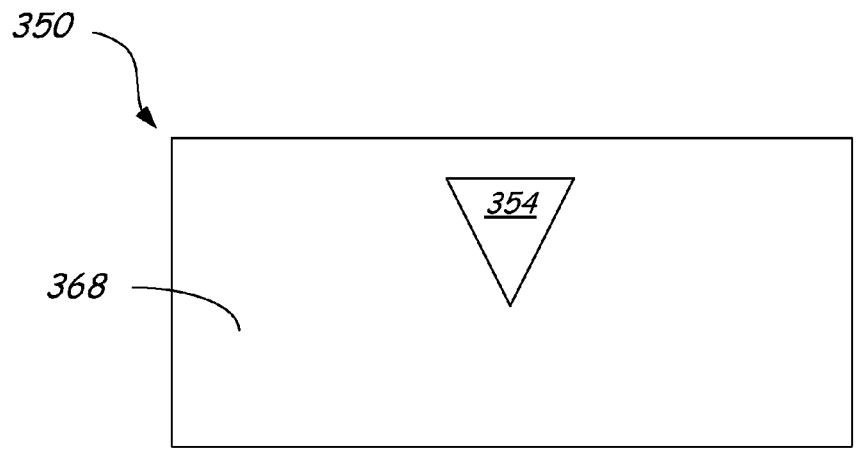
FIG. 13 is a cross sectional view of several layers illustrated in FIG. 11 after additional manufacturing procedures have been performed.
Figure 14:
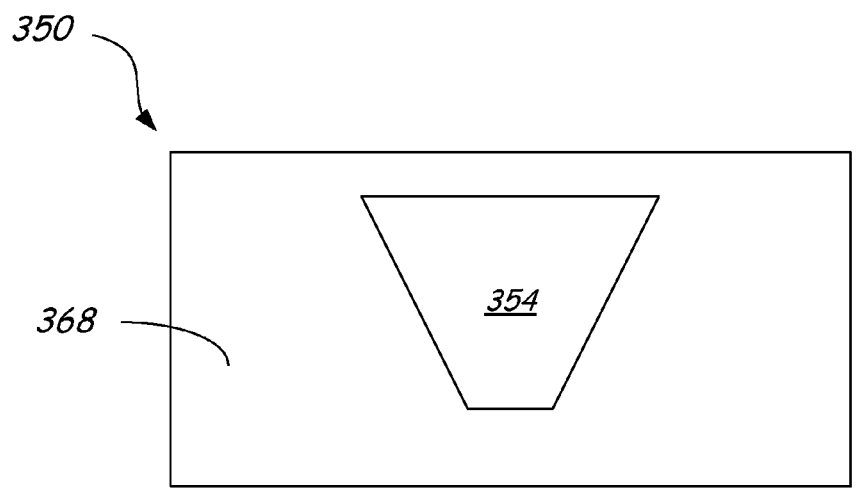
FIG. 14 is a cross sectional view of the several layers illustrated in FIG. 12 after additional manufacturing procedures have been performed.

After depositing the non-magnetic material onto the wafer 350, the method 300 further includes removing masking layers of material, as is illustrated in block 310. In one illustrative embodiment, a first masking layer removal process includes a chemical mechanical polishing (CMP) process. During the CMP process, portions of the non-magnetic material 368, including the bulge 370, are removed from the wafer 350 until the masking layer 360. The layer 360 is made of SiC, as is discussed above, which is resistant to the CMP process. FIGS. 9 and 10 illustrate a portion of the wafer 350 at the air-bearing surface and below the air-bearing surface, respectively, after the CMP process has been performed. The process illustrated in block 310 also includes, in one embodiment, a process of inductively coupled plasma (ICP) etching to remove masking layer 360, as shown in FIGS. 11 and 12, which, like FIGS. 9 and 10, illustrate a portion of the wafer at the air-bearing surface and below the air-bearing surface, respectively. The process illustrated in block 310 further illustratively includes, in one embodiment, milling layer 358 using an ion milling process. After removing the layer 358 (as shown in FIGS. 13 and 14), the wafer 350 is left with write pole material 354 that is surrounded by non-magnetic material 368. Further processes to create the wafer 350 can then be performed as are advantageous.

Returning again to FIG. 2, the bevel 216 is self-aligned with respect to the rest of the write pole 200 via the method 300 discussed above. The precise positioning of the bevel 216, achieved in the method 300 along with its conformance to the overall shape of the write pole 200 enables a bevel 216 to have a relatively large height, which, in turn, serves to provide improved magnetic field enhancement, even in designs with increasingly dense storage media. Further, when the write pole 200 has a sufficient height the write pole 200 no longer needs a yoke. Conventional yoke design with a straight wall profile requires that the yoke be positioned further behind the air-bearing surface 202 to prevent inadvertent side track erasure, resulting in reduced write-ability because of a reduced magnetic field. The slope of the bevel 216, however, allows the bevel 216 to be positioned very close behind the air-bearing surface while at the same time allowing the magnetic field to be focused within the top pole height 210 at the air-bearing surface. This produces an increased magnetic field within the area in front of the proximal end 202 of the write pole 200, which improves high data performance and writability on storage media with high areal densities. In addition, eliminating the yoke reduces complexity in the manufacturing process.

Figure 15:
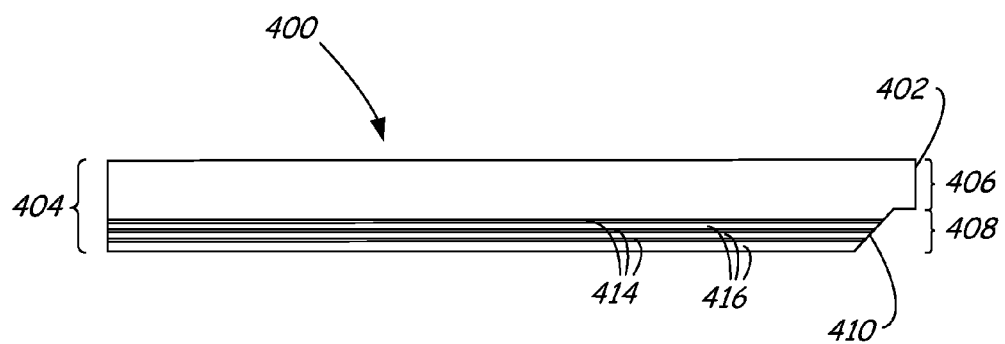
FIG. 15 illustrates a side view of a write pole of an interactive element of the type having a beveled side according to another illustrative embodiment.

FIG. 15 is an illustration of a side view of a write pole 400 according to another illustrative embodiment. Write pole 400 has an air-bearing surface 402 and height 404 that equals the top pole height 406 plus the height 408 of a bevel 410. The bevel 410 includes a plurality of layers 414 of non-magnetic materials that alternate between layers 416 of pole material. By including the layers 414 of non-magnetic materials, it is possible to more effectively focus the magnetic field provided by the write pole 400 and reduce eddy current effects. Because the pole material of write pole 400 is applied by sputtering as opposed to electroplating, it is possible to precisely apply layers 414 of non-magnetic materials.

The embodiments discussed above provide several advantages. For example, the embodiments enhance the magnetic field provided by the interactive element, reduce the transition curvature by enhancing the field at the corner of the poles, and reduce adjacent track interference, by focusing the magnetic field over the track with which the element interacts. All of these advantages lead to improved areal density capability It is to be understood that even though numerous characteristics and advantages of the various embodiments have been set forth in the foregoing description, together with details of the structure and function of various embodiments, this disclosure is illustrative only, and changes may be made in detail, especially in matters of structure and arrangement of parts within the principles of the present embodiments to the full extent indicated by the broad general meaning of the terms in which the appended claims are expressed.

What is claimed is:

1. A write pole comprising:
  a proximal end and a distal end that is opposite the proximal end, the proximal end being a part of a bearing surface;
  a top surface and a bottom surface that is opposite the top surface, the top surface being perpendicular to the bearing surface,
  wherein the bottom surface includes a bevel having a multi-layered region, and
  wherein the write pole includes no attached yoke.

2. The write pole of claim 1 and further comprising a height, which is a distance between the top surface and the bottom surface, wherein the height of the write pole at the proximal end is a top pole height and the height of the write pole at the distal end is an overall pole height, and wherein the top pole height is less than the overall pole height.

3. The write pole of claim 2, wherein the height of the write pole is substantially equal to the top pole height between the proximal end and a break point that is between the proximal end and the distal end.

4. The write pole of claim 3, wherein the bevel is between the break point and distal end, and wherein, beginning at the break point, the bottom surface tapers away from the top surface until the pole height is equal to the overall pole height.

5. The write pole of claim 4, wherein the break point is away from a boundary between the multi-layered region and a remaining portion of the write pole.

6. The write pole of claim 1, wherein the multi-layered region has a height that is less than a height of the bevel.

7. The write pole of claim 1, wherein the bevel is configured to focus a magnetic field produced by the write pole in an area of the proximal end.

8. The write pole of claim 1, wherein the multi-layered region comprises non-magnetic layers that alternate with layers of magnetic pole material.

9. A write pole comprising:
a proximal end that is a part of a bearing surface;
a distal end that is opposite the proximal end; and
a bevel, between the proximal end and the distal end, configured to focus a write pole magnetic field in an area of the proximal end,
wherein the bevel includes a multi-layered region having a height that is less than a height of the bevel, and
wherein the write pole includes no attached yoke.

10. The write pole of claim 9, wherein the plurality of layers comprises non-magnetic layers that alternate with layers of magnetic pole material.

11. An interactive element comprising the write pole of claim 9.

12. A write pole comprising:
a proximal end that is a part of a bearing surface;
a distal end that is opposite the proximal end; and
a top surface and a bottom surface that is opposite the top surface, the top surface being perpendicular to the bearing surface,
wherein the bottom surface includes a bevel, and
wherein the write pole includes no attached yoke, and
wherein the bevel includes a multi-layered region having a height that is less than a height of the bevel.

13. The write pole of claim 12, wherein the multi-layered region comprises non-magnetic layers that alternate with layers of magnetic pole material.

* * * * *